United States Patent

Satori

[15] 3,697,835
[45] Oct. 10, 1972

[54] CAPACITIVE PRESSURE TRANSDUCER

[72] Inventor: Gyula Satori, Budapest, Hungary
[73] Assignee: Medicor Muvek, Budapest, Hungary
[22] Filed: May 24, 1971
[21] Appl. No.: 145,087

[30] Foreign Application Priority Data

May 25, 1970 Hungary..........................1227

[52] U.S. Cl..............................317/246, 73/398 C
[51] Int. Cl..............................................H01g 7/00
[58] Field of Search...317/246, 240 R, 250; 179/106; 73/398 C

[56] References Cited

UNITED STATES PATENTS

| | | | |
|---|---|---|---|
| 2,751,530 | 6/1956 | Armstrong | 317/246 |
| 3,195,028 | 7/1965 | Werner | 317/246 |
| 3,249,833 | 5/1966 | Vosteen | 317/246 |

*Primary Examiner*—E. A. Goldberg
*Attorney*—Young & Thompson

[57] ABSTRACT

Known capacitive pressure transducers comprise a wheatstone bridge connection in each branch of which there is a capacitance. Two of them are variable while the two others are arranged on a diaphragm in a casing. The chamber of the casing is subdivided by the diaphragm into a pair of compartments and each compartment is arranged for being connected to a system the pressure of which is to be measured. Such arrangement requires considerable space and is intricate to manipulate. Moreover, its output signals are of low level due to only one pair of capacitances being variable. This invention employs four variable capacitances distributed in the individual branches of a Wheatstone bridge connection for which purpose four electrodes are supported on opposite sides of the diaphragm. Further four electrodes are arranged within the casing opposite to the electrodes on the diaphragm. Thus, four variable capacitances are formed which are connected to form a wheatstone bridge connection. Deflections of the diaphragms caused by such pressure entail variations of the bridge capacitances and, thereby output voltage signals of increased strength on the bridge terminals.

2 Claims, 7 Drawing Figures

3,697,835

CAPACITIVE PRESSURE TRANSDUCER

BACKGROUND OF THE INVENTION

This invention relates to capacitive pressure transducers.

Pressure transducers are destined to convert pressure changes into electric signals which may then be evaluated as such. Pressure transducers are already known in which an elastic diaphragm in a casing serves for sensing a pressure to be measured. Deflections of the diaphragm are, by means of linkages, used to change the values of resistances or semi-conductors arranged in bridge connections. Output voltages of the bridge connection are amplified and represent electric signals which are proportional to pressure changes within the casing. Known pressure transducers of such type work either with inductive or with capacitive members in their bridge connections.

The known capacitive pressure transducers are provided with an elastic diaphragm both sides of which carry each one electrode of a pair of capacitances, the other electrodes of the same capacitances being arranged on the inside wall of the casing opposite to the diaphragm. Two capacitances lie outside the casing and form with those within the casing a bridge connection which may be balanced by changing the variable capacitances. Such known type of the capacitive pressure transducers has to be balanced prior to carrying out measuring. In addition, two of the capacitances lie outside the casing of the pressure transducer by which its manipulation is rendered complicated. Two of the capacitances being invariable, the output signals of the bridge connections are unduly weak.

SUMMARY OF THE INVENTION

The main object of the present invention is to obviate such deficiencies and to provide an efficient capacitive pressure transducer the bridge connection of which is automatically balanced without varying the capacitances, and is distinguished by compact design and moderate space requirement. The invention recognizes that a complete symmetry of the design automatically ensures the compensation of the bridge connection, and such symmetric design is obtainable if all capacitances are arranged within the casing of the pressure transducer in such a manner that they act pairwise against each other. The basic idea of the invention is that such a mode of operation is simply obtainable by a subdivision of the electrodes. A subdivision of the electrodes on opposite sides of the diaphragm provides four movable electrodes. A subdivision of the electrodes on the inside wall of the casing provides, in turn, four stationary electrodes. Thus, four variable capacitances may be formed within the casing. These capacitances have to be connected so as to form a bridge connection in which they work against each other. To obtain such a mode of operation, capacitances lying in opposite bridge branches have to be arranged on the same side of the diaphragm. All four capacitances being variable, vigorous output signals will be obtained.

Thus, the invention relates to a capacitive pressure transducer which has, in a manner known per se, a diaphragm in a casing and capacitive electrodes on the diaphragm and on the casing, the electrodes forming pairwise capacitances which lie in a bridge connection. The invention proper consists in that four electrodes are provided on the diaphragm and their associated electrodes are provided on the casing, capacitances lying in opposite branches of the bridge being arranged on the same side of the diaphragm.

Further details of the invention will be described with reference to the accompanying drawings which show, by way of example, an embodiment of the new capacitive pressure transducer.

DETAILED DESCRIPTION OF THE PREFERRED EMBODIMENT

Figure 1:
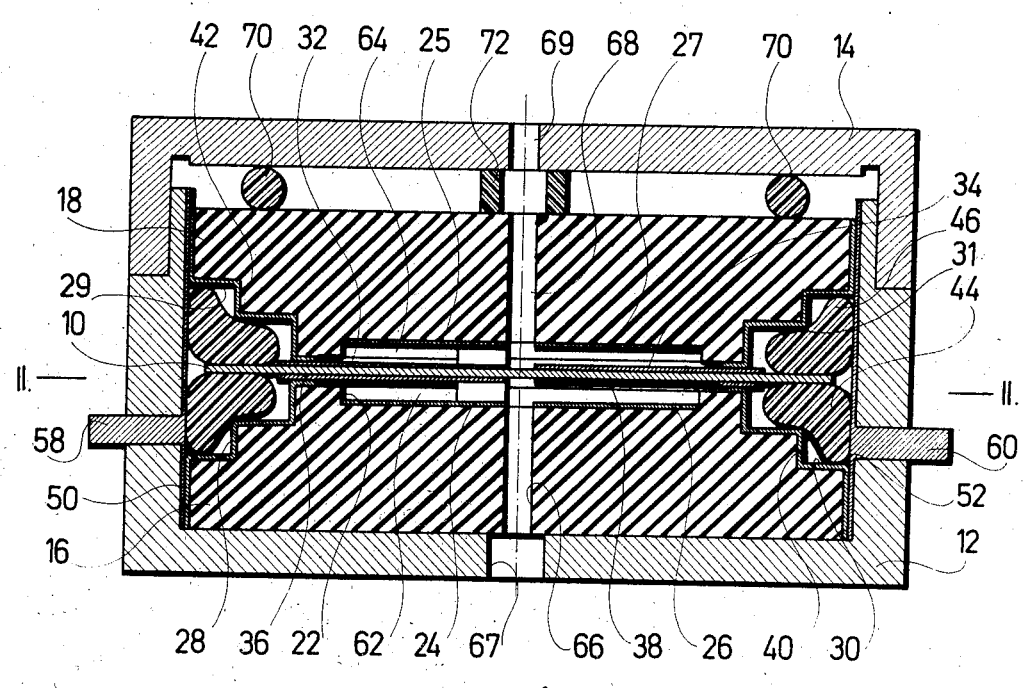
FIG. 1 is a longitudinal sectional view of the exemplified embodiment taken along the line I—I in FIG. 2.
Figure 2:
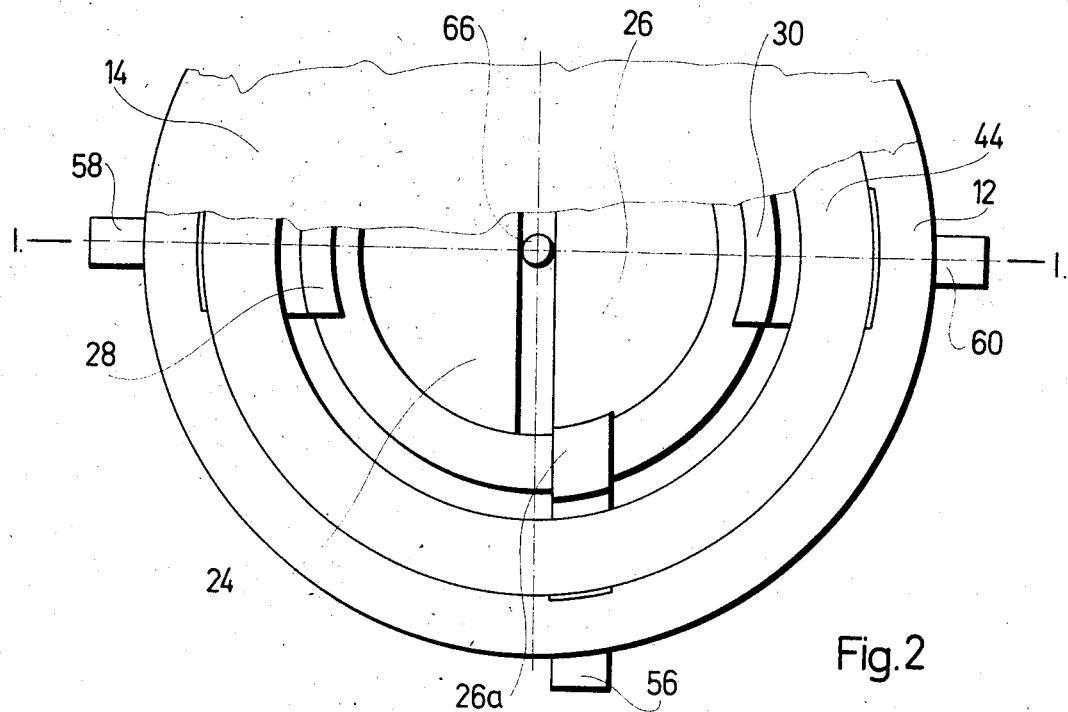
FIG. 2 is a sectional view taken along the line II—II of FIG. 1.

In the drawing, the represented embodiment of the capacitive pressure transducer according to the invention has a diaphragm 10 which is accommodated in a casing 12. The casing 12 is a hollow cylindrical body the opening of which may be closed by a lid 14. The casing 12 has a pair of uniform support bodies 16 and 18 arranged in it which form a mirror arrangement within the casing 12.

Figure 3:
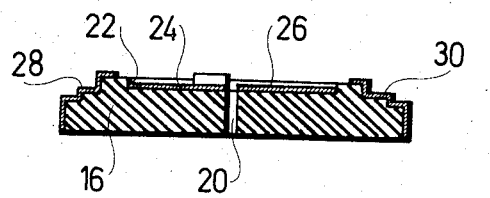
FIG. 3 is a cross-sectional view of a detail taken on the line III—III of FIG. 4.
Figure 4:
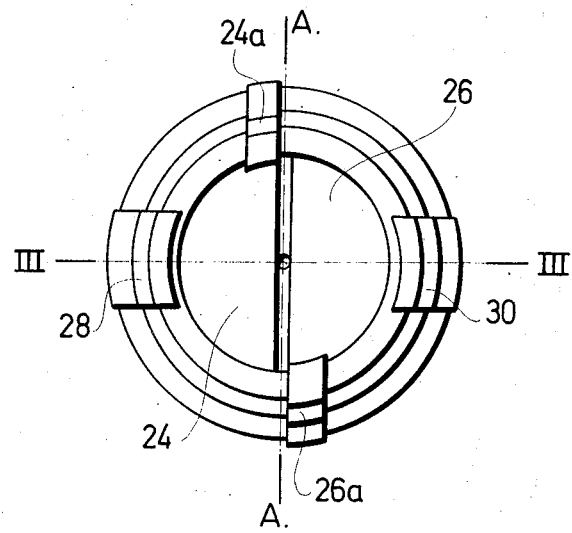
FIG. 4 is a plan view of FIG. 3

Details of the support bodies 16 and 18 are illustrated in FIG. 3 and 4 which represent the support body 16. On the top side of the support body 16 there is a recess 22 which accommodates a pair of stationary electrodes 24 and 26 which are separated from one another along a line A—A and which may contact the cylindrical inside wall of the casing 12 by means of bent down lugs 24a and 26a, respectively. Further lugs 28 and 30 serve with their bent down extremities to connect electrodes on the diaphragm 10 as seen in FIG. 1.

The support body 18 is similar to the support body 16. Its electrodes and connection lugs are designated by reference characters 25, 27 and 29, 31, respectively.

Both support bodies 16 and 18 are made of insulation material such as synthetic resin, the electrodes and the connection lugs 24 to 27 and 28 to 31, respectively, being applied to these insulation bodies e.g. by evaporation or galvanically.

Figure 5:
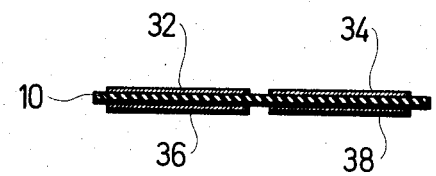
FIG. 5 is a sectional view of another detail taken along the line V—V of FIG. 6
Figure 6:
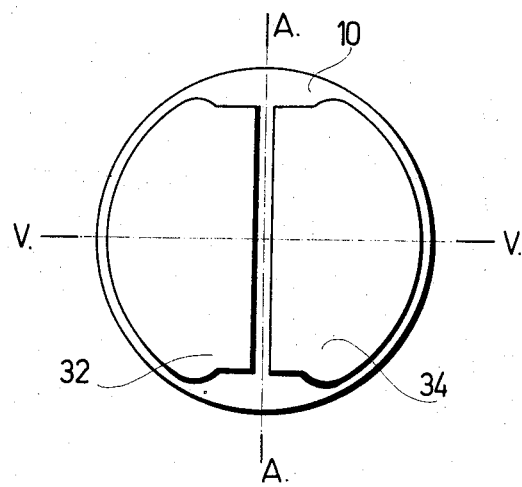
FIG. 6 is a plan view of FIG. 5

Details of the diaphragm 10 are shown in FIGS. 5 and 6. A disk made of elastic synthetic material and forming the diaphragm 10 carries four movable electrodes 32, 34 and 36, 38, the members of each pair of electrodes being separated from one another along the line A—A. The electrodes are applied to the diaphragm likewise by e.g. evaporation or galvanically. The recesses in the surface areas of the electrodes 32, 34 and 36, 38 are destined to accommodate connection streaks or conductors of the stationary electrodes in the casing 12 opposite to the diaphragm 10.

Both support bodies 16 and 18 are provided with steppings 40 and 42 which permit O-rings 44 and 46, respectively, to roll down. The inner diameters of the O-rings 44 and 46 are slightly smaller than the diameter of the innermost step of the steppings 40 and 42, respectively. Thus, when the O-rings 44 and 46 are pressed onto their respective steppings 40 and 42, their diameters become increased whereby the O-rings 44 and 46 exert radially outward forces on the diaphragm 10 so that the latter is, as it were, tightened. Rolling down of the O-rings 44 and 46 is ensured by the fact that the diameters of their cross-sectional areas are greater than the radial width of the steppings 40 and 42, respectively.

Connection is obtained by the cylindrical casing 12 the inside wall of which is provided with four metallic contact streaks 50, 52, 54a and 56a forming connection conductors and extending in the longitudinal direction of the transducer.

Figure 7:
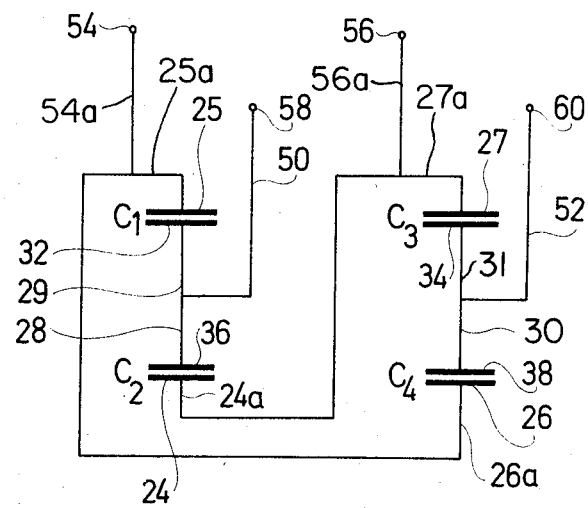
FIG. 7 is a simplified circuit diagram.

The electric circuit of the electrodes 24 to 27 and 32, 34, 36, 38 is shown in FIG. 7. It will be seen that the electrodes form pairwise four variable capacitances $C_1$, $C_2$, $C_3$ and $C_4$. Terminals of the bridge connection are designated with reference characters 54, 56, 58 and 60. Portions of the connection conductors which are represented also in other figures are designated with the respective reference characters. The input of the bridge connection is formed e.g. by the terminals 54 and 56 while the terminals 58 and 60 represent the output thereof. However, due to the symmetric arrangement of the bridge components, the terminals may pairwise be interchanged as well.

It can be shown that a bridge output voltage will be obtained which is proportional to the displacements of the electrodes if each bridge capacitance $C_1$ to $C_4$ varies in the same manner. Furthermore, it will be seen that in each pair of opposite branches of the bridge connection there are capacitances $C_1$ and $C_3$ on the one hand and $C_2$ and $C_4$ on the other hand which vary in the same manner. These capacitances lie pairwise on the same side of the diaphragm 10. Moreover, it can be shown that a pressure transducer provided with a bridge connection of the above described type supplies signals which, within the elastic limit of the material of the diaphragm 10, supplies linear signals.

Pressure transducers of various sensitivity may be obtained by varying the thickness of the diaphragm 10. The diaphragm 10 subdivides the chamber within the casing 12 into a pair of pressure compartments 62 and 64 which are connected through channels 66 and 68 with apertures 67 and 69 in the bottom of the casing 12 and in the lid 14 thereof, respectively. A pressure to be measured is propagated through the channels 66 or 68 into the pressure compartments 62 and 64, respectively.

In assembling the support 16, its O-ring 44 is accommodated in the casing 12 in such a manner that the A— A lines of the various component parts register, viz., the connection lugs 28 and 30 lie against the contact streaks 50 and 52, respectively. Then also the connection lugs 24a and 26a will lie against their associated contact streaks 56a and 54a, respectively, in the interior of the casing 12. The top portion of the O-ring 44 protruding from the surface of the support body 16 has the diaphragm 10 laid on it, whereafter the support body 18 with its O-ring 46 is put on the diaphragm 10 in such a manner that its connection lugs 29 and 31 lie likewise against the contact streaks 50 and 52, and its connection lugs 25a and 27a lie against the contact streaks 54a and 56a, respectively. Thus a bridge connection according to FIG. 7 is obtained, the necessary contact pressure being ensured by the fact that the support body 18 with its O-ring 46, the diaphragm 10, the O-ring 44 and the support body 16 are as a unit compressed by the lid 14 by the intermediary of a pair of rubber inserts 70 and 72. The lid 14 is retained in its closed position by its tight fit. Meanwhile, the O-rings 44 and 46 roll down on their associated steppings 40 and 42, respectively, so that the diaphragm 10 becomes radially stretched in an outward direction and held in such tight condition by both O-rings 44 and 46.

The terminals 54 and 56 will be connected e.g. to a voltage source which supplies a sinusoidal voltage. Both other terminals 58 and 60 are connected with each other through a measuring instrument in a manner known per se and, therefore, not represented in the drawing. Due to the described perfectly symmetric structure of the transducer, the bridge connection according to FIG. 7 is, in the unloaded condition of the diaphragm 10, automatically compensated so that the measuring instrument across the terminals 58 and 60 occupies its zero position.

In measuring, e.g. when the pressure of a blood stream is to be measured, one of the pressure compartments 62 and 64, e.g. the pressure compartment 64 is connected with the blood stream so that the blood pressure appears, through the aperture 69, the rubber insert 72 and the channel 68, also in the pressure compartment 64 which is, in the instant case, the measuring chamber. Dependent on the pressure compartments 62 and 64 the diaphragm 10 is deflected in the direction of smaller pressure whereupon a voltage of modulated amplitude will appear across the terminals 58 and 60 which is proportional to the deflection of the diaphragm 10 also beyond the elastic limit of the diaphragm material. On the other hand, within the elastic limit the signal voltages will be proportional also to the pressure difference acting on the diaphragm 10.

Tests have shown that the pressure transducer according to the invention is suitable to measure pressure changes in the order of magnitude of 0.1 pounds per square centimeter which is in the range of water column millimeters, the changes being superposed on pressures of about 1 absolute atmosphere.

The pressure transducer according to the invention is distinguished from the known pressure transducers of similar kind by the advantage that its design offers a perfect symmetry also as regards the changes of capacitances. Thus the symmetry of its design is, at the same time, a characteristic feature of the pressure transducer according to the invention. In addition, the push-pull action of the capacitances yields a double output signal, in contrast to the known pressure transducers which have but one pair of variable capacitances. At the appearance of uniform pressures on both diaphragm sides, that is in both pressure compartments 62 and 64, no deflections of the diaphragm 10 will take place. This means that the pressure transducer according to the invention is insensitive as regards atmospheric pressure changes. The employment of capacitances of the same type yields a linear relation between the difference of pressures on both sides of the diaphragm 10 and the output voltage of the bridge connection. A further advantage consists in the moderate space requirement of the pressure transducer according to the invention, in contrast to known devices with which an increase of sensitivity is obtained by increasing the diameter of the diaphragm. The robust structure of the pressure transducer according to the invention permits use under rougher work conditions since it is substantially insensitive to careless use. It will be seen that also manufacturing costs are low and the probabilities of break-downs are very slight. Thus, the new pressure transducer is particularly suitable for mass production.

Hereinbefore, the invention has been described in connection with a pressure transducer the electrodes and lead-in conductors of which were formed by evaporation or galvanically. However, it is possible that the electrodes and their lead-in conductors form parts of printed circuits.

It will be seen that the new pressure transducer is suitable, besides measuring pressure changes in blood streams, also for being employed in a broad field of industrial activity such as the flow of gases and liquids, the measuring of temperatures and pressure changes, etc.

What we claim is:

1. A capacitive pressure transducer comprising, in combination, a casing (12), a diaphragm (10) in said casing and subdividing its interior into a first pressure compartment (62) and a second pressure compartment (64), a first terminal (54), a second terminal (56), a third terminal (58) and a fourth terminal (60) in the wall of said casing (12), a first capacitive electrode (24) and a second capacitive electrode (26) on the wall of said casing confining said first pressure compartment (62), a third capacitive electrode (25) and a fourth capacitive electrode (27) on the wall of said casing confining said second pressure compartment (64), a fifth capacitive electrode (36) and a sixth capacitive electrode (38) on one side of said diaphragm facing said confining wall of said first pressure compartment (62), a seventh capacitive electrode (32) and an eighth capacitive electrode (34) on the opposite side of said diaphragm facing said confining wall of said second pressure compartment (64), a first contact streak (54a) connecting said first terminal (54) by a first connection lug (26a) with said second capacitive electrode (26) and by a second connection lug (25a) with said third capacitive electrode (25), a second contact streak (50) connecting said third terminal (58) by a third connection lug (29) with said seventh capacitive electrode (32) and by a fourth connection lug (28) with said fifth capacitive electrode (36), a third contact streak (56a) connecting said second terminal (56) by a fifth connection lug (24a) with said first capacitive electrode (24) and by a sixth connection lug (27a) with said fourth capacitive electrode (27), and a fourth contact streak (52) connecting said fourth terminal (60) by a seventh connection lug (31) with said eighth capacitive electrode and by an eighth connection lug (30) with said sixth capacitive electrode.

2. A capacitive pressure transducer as claimed in claim 1, said casing and diaphragm being circular, a pair of rings that clamp the periphery of said diaphragm between them, and means urging said O-rings radially outwardly entirely about the axis of said casing thereby radially to tighten said diaphragm.

* * * * *